US008226038B2

(12) United States Patent
Smith et al.

(10) Patent No.: US 8,226,038 B2
(45) Date of Patent: Jul. 24, 2012

(54) MICROVANES FOR AIRCRAFT AFT BODY DRAG REDUCTION (75) Inventors: Brian R. Smith, Colleyville, TX (US); Brant H. Maines, Colleyville, TX (US); Edward C. Ma, Houston, TX (US); Edward A. DiGirolamo, Woodstock, GA (US); Patrick J. Yagle, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 704 days.

(21) Appl. No.: 12/406,819

(22) Filed: Mar. 18, 2009

(65) Prior Publication Data
US 2011/0180146 A1 Jul. 28, 2011

(51) Int. Cl.
B64C 1/38 (2006.01)
(52) U.S. Cl. ....................................... 244/130
(58) Field of Classification Search .......... 244/130, 244/1 R, 129.1
See application file for complete search history.

(56) References Cited

U.S. PATENT DOCUMENTS

| 2,800,291 | A | | 7/1957 | Stephens |
| 3,419,232 | A | | 12/1968 | McStay et al. |
| 3,604,661 | A | * | 9/1971 | Mayer, Jr. ............ 244/207 |
| 3,794,274 | A | * | 2/1974 | Eknes ................... 244/130 |
| 4,114,836 | A | * | 9/1978 | Graham et al. ........ 244/1 N |
| 4,284,302 | A | * | 8/1981 | Drews ................... 296/181.5 |
| 4,650,138 | A | | 3/1987 | Grose |
| 4,718,620 | A | | 1/1988 | Braden et al. |
| 4,736,913 | A | | 4/1988 | Bennett et al. |
| 4,932,612 | A | | 6/1990 | Blackwelder et al. |
| 5,069,402 | A | * | 12/1991 | Wortman ............... 244/130 |
| 5,069,403 | A | * | 12/1991 | Marentic et al. ...... 244/130 |
| 5,133,516 | A | * | 7/1992 | Marentic et al. ...... 244/130 |
| 5,417,391 | A | * | 5/1995 | Savitsky et al. ...... 244/204.1 |
| 5,848,769 | A | * | 12/1998 | Fronek et al. ......... 244/200 |
| 5,860,626 | A | * | 1/1999 | Moser .................. 244/200 |
| 6,446,908 | B1 | | 9/2002 | Saiz |
| 6,669,142 | B2 | | 12/2003 | Saiz |
| 6,715,717 | B2 | * | 4/2004 | Dixon et al. .......... 244/130 |
| 7,041,363 | B2 | | 5/2006 | Krohmer et al. |
| 7,070,850 | B2 | * | 7/2006 | Dietz et al. ........... 428/172 |
| 2004/0046086 | A1 | | 3/2004 | Dixon et al. |
| 2007/0194178 | A1 | | 8/2007 | Lang |

FOREIGN PATENT DOCUMENTS

| EP | 1710156 A2 | 10/2006 |
| WO | 2006/105174 A2 | 10/2006 |

* cited by examiner

*Primary Examiner* — Richard Price, Jr.
(74) *Attorney, Agent, or Firm* — Bracewell & Giuliani LLP (57) ABSTRACT The invention relates a method and apparatus for reducing the drag on aircraft, particularly aircraft with an upswept afterbody. The method includes the steps of positioning a plurality of drag reducing elements on the fuselage of the aircraft, wherein the drag reducing elements are positioned on the fuselage from a position at the breakline of the fuselage and extending toward the tail of the aircraft. In preferred embodiments, each of the plurality of drag reducing elements is positioned such that a first end of the drag reducing element is at an angle of between approximately 15 and 35° nose up relative to the flow of air about the fuselage at the location where the drag reducing element is positioned.

24 Claims, 6 Drawing Sheets

MICROVANES FOR AIRCRAFT AFT BODY DRAG REDUCTION

FIELD OF THE INVENTION

The invention relates a method and apparatus for reducing the drag on aircraft, particularly aircraft having an upswept afterbody.

BACKGROUND OF THE INVENTION

The aft fuselage section of a variety of aircraft, particularly military transport and cargo aircraft, have a significant upsweep on the underside of the fuselage due to the presence of a main cargo door. The upswept surface typically contributes significant drag to the aircraft, and can be responsible for vortices that form on the underside of the aft fuselage due to the flow of air sweeping around the sides of the fuselage toward the bottom of the fuselage. These vortices typically strengthen as they progress downstream and interact with the vertical tail, thereby generating significant overall drag on the aircraft.

A variety of methods and devices to reduce drag on aircraft have been previously proposed and are known in the art. One exemplary method, known as streamlining, includes the shaping of an airplane to minimize drag. Winglets or other devices positioned at the tips of the wings or on the wings of aircraft are another method for reducing drag on an aircraft. Yet another method for reducing drag on an aircraft includes the use of microgrooves or "riblets" along surface of the fuselage or wings of an aircraft. Furthermore, studies have been reported wherein the use of aft body fairings, aft cavities, vortex strakes, and beavertail strakes have been evaluated for the C-130 airframe.

As fuel costs rise, there is increased importance to reduce the overall drag on the aircraft, as a reduction in drag can significantly reduce operating costs due to of reduced fuel consumption. Thus, there exists a present need for methods and devices operable for reducing drag on aircraft.

SUMMARY

Provided are methods and devices for reducing drag in aircraft, particularly aircraft having an upswept afterbody.

In one aspect, an aircraft having a fuselage and an upswept after body beginning at the breakline is provided. The aircraft includes a plurality of drag reducing elements, each of the drag reducing elements having a first end and a second end. The drag reducing elements are positioned on each side of the aircraft fuselage beginning at the breakline of the fuselage upsweep and extend rearward toward the tail of the aircraft. In certain embodiments, the plurality of drag reducing elements are positioned such that each drag reducing element is between about 10° and 40° nose-up relative to the local airflow at each drag reducing element.

In another aspect, a drag reduction system for an aircraft is provided that includes an array of microvanes positioned along a line following an aft contour of an upswept afterbody of the aircraft beginning at a breakline. The array includes a plurality of microvanes positioned on each side of the aircraft fuselage beginning at the fuselage upsweep breakline and extending rearward toward a vertical stabilizer such that relative to a longitudinal axis of the aircraft, positioned at an angle relative to the local flow such that the forward end of each microvane is raised relative to the rearward end. The plurality of microvanes spaced are apart from each other, each microvane having a flat top surface, a height of less than about 2 inches, a forward end and a rearward end.

In another aspect, a method for reducing drag on an aircraft having an upswept afterbody, wherein the upswept afterbody beginning at a breakline of the fuselage, is provided. The method includes positioning a plurality of drag reducing elements linearly on each side of the afterbody fuselage from a point near the bottom of the fuselage extending upward toward a vertical stabilizer and flying the aircraft, which causes an airflow about the fuselage of the aircraft, wherein the drag reducing elements are operable to reduce production of vortices at the upswept afterbody.

DETAILED DESCRIPTION OF THE INVENTION

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein are set forth without any loss of generality to, and without imposing limitations thereon, the claimed invention.

In one aspect, a method for reducing the overall drag of an aircraft is provided. Specifically, a method is provided for reducing drag associated with upswept aft area of an aircraft, such as for example, a cargo transport aircraft that includes a rear cargo door. Reduction of drag associated with the high upswept area may subsequently result in decreased fuel consumption, increased cruise speed, and increased aircraft range.

The method generally includes the positioning of a plurality of drag reduction devices or microvanes at the aft of the aircraft, preferably in a linear manner along or generally following the longitudinal breakline of the fuselage. As used herein, the breakline is defined as the approximate point at which the fuselage sidewalls and upswept bottom wall intersect along the aircraft's longitudinal axis. As used herein, the term microvanes and drag reduction device may be used interchangeably.

Figure 1:
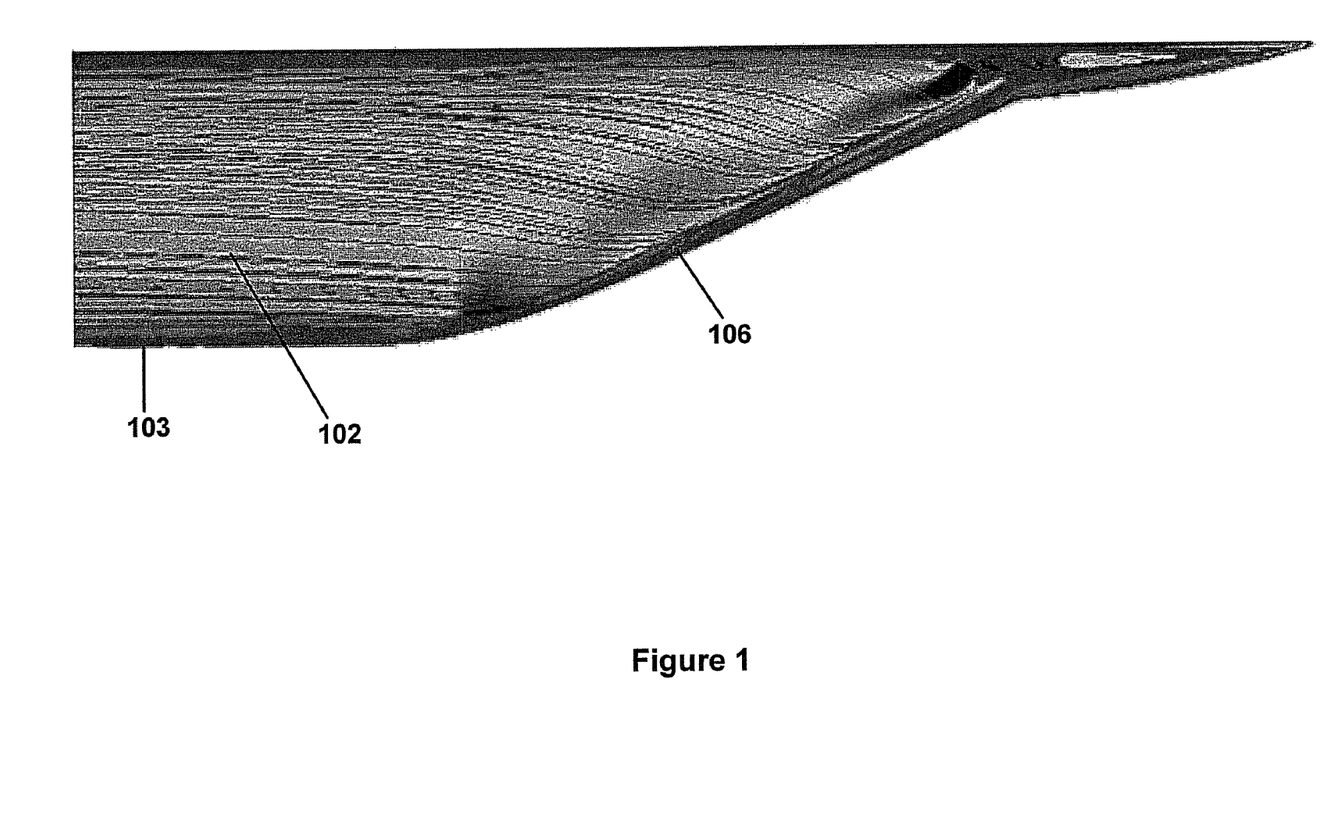
FIG. 1 is a side view of an aircraft showing airflow lines about the aft section of the fuselage.

Referring to FIG. 1, air flow lines about the aft portion of the aircraft are provided. As shown, airflow is generally along the length of fuselage 102, approximately parallel or approximately following the longitudinal axis of the fuselage, at a slightly downward sloping angle, until the point at which the upswept aft section 106 of the fuselage 102 is encountered. At the upswept aft portion of fuselage 102, where bottom 103 of the fuselage ends and the body extends upward, the air flow changes direction dramatically. In the boundary layer near the fuselage surface, the air sweeps downward, and then separates from the surface, forming a streamwise vortex which is convected downstream by the flow past the aircraft. Without wishing to be bound by any particular theory, it is believed that the upswept aft portion of the aircraft, and the airflow at that point, are responsible for significant contribution to the overall drag on the aircraft. In certain embodiments, proper positioning of the drag reducing elements may require knowledge of the air flow conditions about the surface of the fuselage, particularly at the aft portion of the aircraft. FIG. 1 does not show the fuselage with the addition of the microvane according to the present invention.

Figure 2:
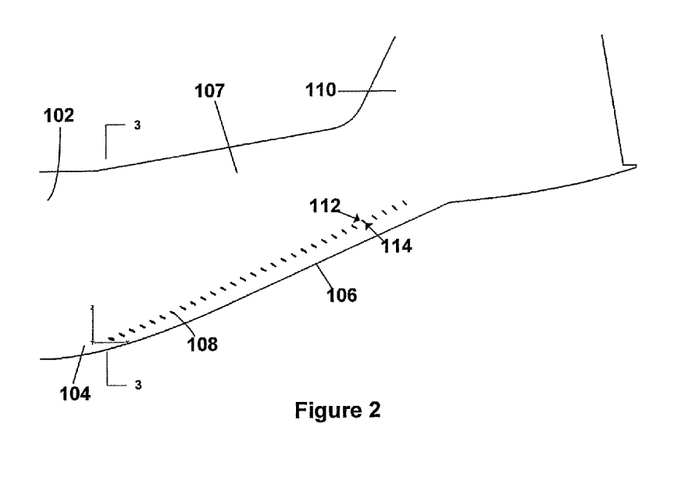
FIG. 2 is a side view of an aircraft showing the positioning of various drag reduction elements in accordance with the invention.
Figure 3:
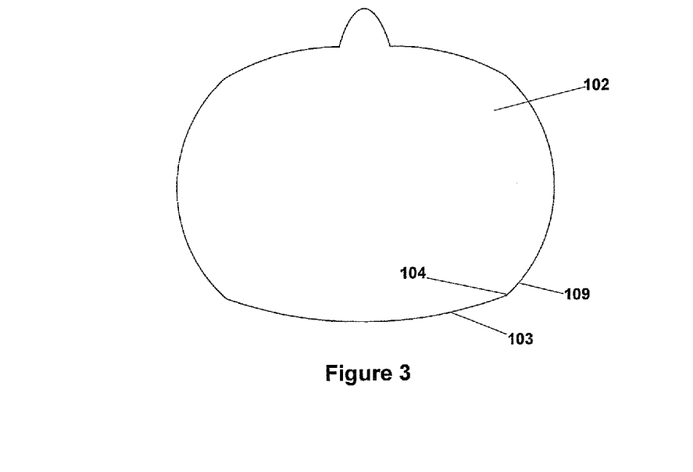
FIG. 3 cross sectional view of an aircraft in accordance with the invention.

Referring to FIG. 2, in one embodiment, a generic aft portion 107 and tail 110 for an aircraft fuselage 102 having an upswept afterbody 106 is provided. A drag reducing array that includes a plurality of microvanes 108, each having forward end 112 and rearward end 114, is linearly positioned along each side of tail section 107 of aircraft fuselage 102, extending approximately in front of and parallel to the breakline 104 rearward toward rear vertical stabilizer 110. This is further illustrated in FIG. 3, wherein the cross-sectional view of an aircraft is provided, demonstrating breakline 104 where the side 102 of fuselage 102 turns toward the bottom 103 of the fuselage, forming a rounded corner. Microvane placement begins at a location 109, above or in front of breakline 104.

In one exemplary embodiment, the array of microvanes 108 may be positioned in a line that is substantially parallel to the plane of the upswept portion 106 of the aircraft fuselage 102. Alternatively, the array of microvanes 108 can be positioned along the upswept aft portion 107 of the fuselage 102 of the aircraft at the point at which the airflow changes direction upstream and outboard of the point of flow separation. In one preferred embodiment, the optimal position of the microvanes 108 is just upstream of the flow separation line (not shown). However, in alternate embodiments, effective drag reduction can be achieved with the microvanes 108 further upstream from the flow separation line. Positioning of the microvanes 108 downstream of breakline, under the flow separation location, is relatively ineffective at reducing overall drag on the aircraft.

Figure 4:
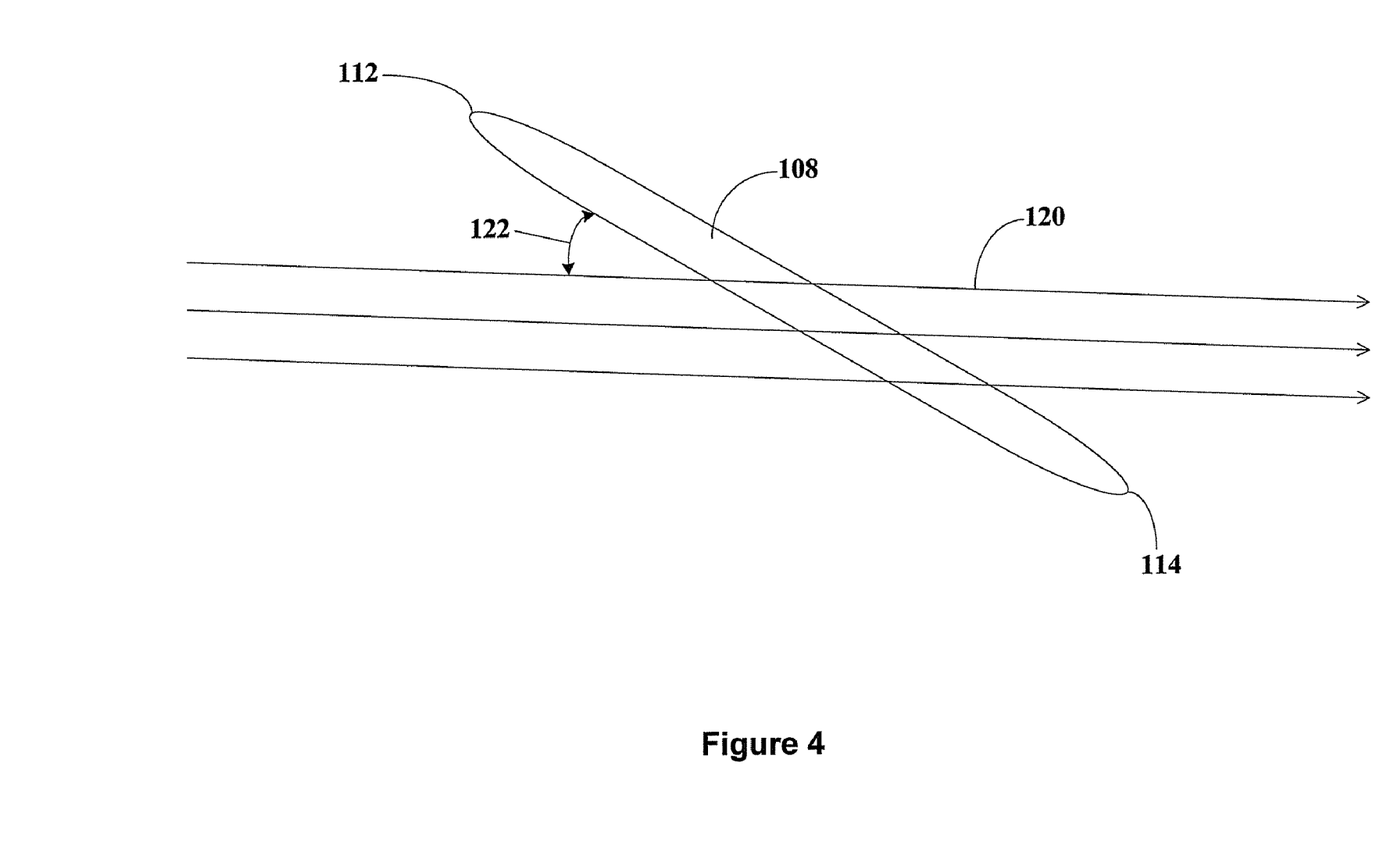
FIG. 4 is a schematic view of an individual drag reducing element according to the present invention.

Referring to FIG. 4, a single exemplary microvane 108 may be positioned such that forward end 112 of each microvane 108 is oriented at an angle 122 of between about 10 and 40° nose up or forward end up with respect to the local flow direction of the air 120 about the fuselage 102 of the aircraft, at the location of the microvane. Put differently, the microvanes may be installed such that the forward end 112 of each microvane 108 is positioned or oriented at an angle 122 of between about 10 and 40° nose-up to the local flow direction of the air 120 about the fuselage of the aircraft. In certain preferred embodiments, the microvanes 108 are oriented or positioned such that the forward end 112 of the microvane at an angle 122 of between about 20 and 30° with respect to the local flow direction of the air 120 about the aircraft, at the location of the microvane. In other embodiments, each drag reducing element may be positioned or oriented at an angle of between approximately 22 and 28° relative to the airflow about the fuselage of the aircraft. In certain preferred embodiments, the microvane 108 may be oriented such that the forward end 112 of the microvane is at an angle 122 approximately 25° with respect to the local flow direction of the air 120 about the aircraft, at the location of the microvane.

In certain embodiments, as the local airflow about the fuselage 102 of the aircraft may not be uniform from the top to bottom of the fuselage, the orientation of the plurality of microvanes 108 may be non-uniform, relative to other microvanes positioned on the fuselage of the aircraft. Put differently, in certain embodiments, it is preferred that each microvane is oriented at a constant angle of attack, relative to the local flow direction at each vane. Alternatively, the orientation of all microvanes 108 may be uniform, relative to a fixed location on the aircraft.

Each individual microvane 108 can be between about 0.25 and 2 inches in height. Preferably, each microvane 108 is between about 0.3 and 1.2 inches in height. In certain embodiments, each microvane 108 is approximately 0.6 inches tall. Optionally, the height of the microvanes 108 may vary between about 0.6 and 1.2 inches. In certain embodiments, the size of the microvane 108 may depend on the size of the aircraft and may be scaled to size accordingly.

Each individual microvane 108 can be less than 25 inches in length, preferably between about 5 and 20 inches in length. In certain embodiments, each microvane 108 may be between about 5 and 15 inches in length, preferably between approximately 8 and 12 inches in length. Optionally, the length of the microvane 108 is about 10 inches.

In certain embodiments, each individual microvane 108 can be as thin as mechanically practical. The width of the microvane 108 can be up to or greater than equal to the height, however thinner microvanes may be preferred. In certain embodiments, each microvane 108 is between about 0.25 and 2 inches wide. In certain embodiments, the width of each microvane 108 can be between 0.3 and 1.2 inches. Optionally, each microvane 108 may be about 0.6 inches wide. In certain embodiments, the thickness of each microvane may be between about 0.06 and 0.25 inches. Alternatively, the thickness of each microvane may be between about 0.1 and 0.2 inches. The cross-sectional shape of the microvanes 108 can be rectangular or triangular. In certain embodiments, the microvanes 108 may have a uniform width. In certain embodiments, at least one microvane 108 may have a different width than an adjacent microvane.

In certain embodiments, the plurality of microvanes 108 may have a uniform geometry and dimensions. In alternate embodiments, at least one microvane 108 may have a geometry and dimension that is different from at least one other microvane.

In certain embodiments, the aircraft can include at least 15 microvanes 108 per side. In other embodiments, the aircraft can include at least 25 microvanes 108 per side. In yet other embodiments, the aircraft can include at least 30 microvanes 108 per side. Depending upon the size of the microvanes and the size of the aircraft, in certain embodiments the aircraft may include at least 50 microvanes 108 per side, at least 75 microvanes per side, or at least 100 microvanes per side. In certain embodiments, rather than being based upon a specific number, the number of microvanes 108 positioned on each side of the aircraft fuselage 102 is determined based upon the distance between the breakline 104 of the fuselage 102 and the tail 110 of the aircraft and the dimensions of each microvane. In certain embodiments, the plurality of microvanes may not extend the entire length from the breakline of the fuselage to the tail.

Figure 5:
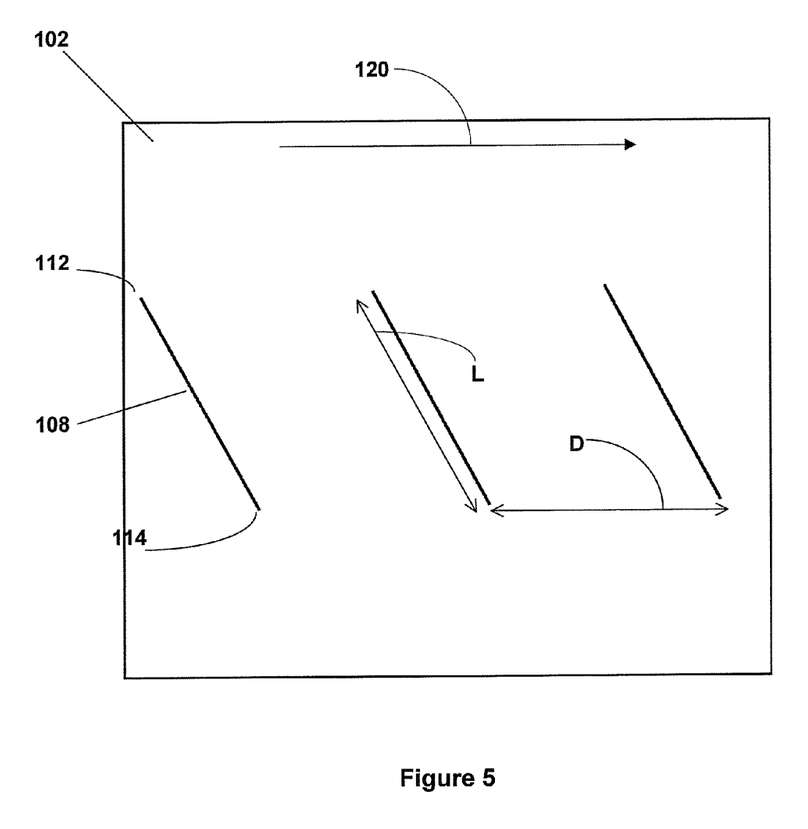
FIG. 5 is a schematic view of a plurality of drag reducing elements according to the present invention.

In reference to the spacing between each microvane 108, the microvanes may include some nominal spacing between adjacent microvanes. As shown in FIG. 5, in certain embodiments, effective drag reduction may be obtained with the forward tip 112 of each microvane 108 being spaced about one chord length L away from the tip of the adjacent microvanes. In alternate embodiments, each microvane 108 may be spaced at intervals between 0.5 and 2 chord lengths apart. It is understood that in certain embodiments, the spacing for all microvanes 108 may be uniform, and in other embodiments the spacing between adjacent microvanes may vary.

The relative size, alignment, number, orientation, positioning and shape of the microvanes 108 can vary and generally depends upon the particular end application, including, but not limited to, the type and shape and/or geometry of the aircraft to which the microvanes are applied.

As noted previously, it is understood that the shape and dimensions of the microvanes 108 can vary. Accordingly, in certain embodiments the microvanes 108 can be rectangular in planform. In alternate embodiments, the microvanes 108 may be triangular, trapezoidal, or square in planform. Optionally, the microvanes 108 can include at least one narrowed or pointed end. In alternate embodiments, the drag reduction elements may be wider at the aft or rearward end 114 than the forward end 112. In yet another embodiment, the microvane 108 may be wider in the center. In some embodiments, the microvanes 108 are preferably flat on the top portion, however, it is understood that the microvane may also curve upward or may be shaped like a fin. Alternatively, the microvanes 108 may be thicker at the base and thinner at the top. Optionally, the microvanes 108 may be pointed at the top. Alternatively, the microvanes 108 may vary in height from the front to the back, or from the back to the front. In addition, in certain preferred embodiments, the microvanes 108 are substantially alike in size and shape, however, it is also understood that each individual microvane may have a slightly or significantly different size and shape than an adjacent microvane.

Application of drag reduction elements 108 the aircraft fuselage 102 preferably cause no detriment to the overall aircraft performance, other than the desired increased drag reduction.

While the microvanes 108 are shown in FIG. 2 as generally extending from approximately breakline 104 of fuselage 102 to rear stabilizer 110, it is understood that the embodiment shown is merely exemplary of one embodiment. In certain other embodiments the plurality of microvanes 108 may extend to a length that is shorter than the distance between the break line 104 and the rear stabilizer 110.

To test the effectiveness of the microvanes 108 at reducing the overall drag on aircraft, and in particular on aircraft having an upswept aft area, computational fluid dynamics (CFD) simulations employing a finite volume analysis of the Navier-Stokes equations were performed for various orientations of the microvanes and various geometries of the microvanes. Initially, a vane vortex generator model was used to evaluate the performance of each individual microvane 108 on drag reduction. The geometry of the aircraft fuselage, along with the geometries of the vanes were captured in the simulations, including the specific microvane height, orientation, geometry and location, as well as the overall number of microvanes located on the fuselage of the aircraft. For purposes of this analysis, the size, shape, and geometry of each microvane 108 was assumed to be identical. Overall drag for the aircraft was calculated, and the drag on the aft of the aircraft was analyzed. The change in overall drag due to the addition of the microvanes 108, and the benefits resulting therefrom, were determined using computational fluid dynamics simulations. The performance and drag of the wings, horizontal tail and fuselage were all analyzed at cruise conditions.

A series of simulations were performed wherein location and orientation of identically sized drag reduction elements were investigated. In each simulation, the aircraft included 30 microvanes 108 positioned on each side of the aircraft along the upswept portion of the aft fuselage of the aircraft. As shown in Tables 1 and 2, depending upon the orientation and location of the microvane, the overall drag on the aircraft either increased or decreased. In at least one embodiment, the overall drag was reduced by 10 counts, corresponding to a calculated reduced drag of approximately 3%. This reduction in drag translates to a predicted reduction in fuel consumption of approximately 3.2%.

As shown below in Tables 1 and 2, simulations were run to determine the effect of a plurality of microvanes 108 positioned on the fuselage of an aircraft having an aircraft having a large upswept aft. The microvanes 108 were approximately 0.3 inches in height, approximately 10 inches in length, approximately 0.125 inches in width, and had a generally rectangular geometry. Two orientations of the microvanes 108 were simulated. The first orientation is summarized in Table 1, corresponding to the microvane 108 placement demonstrated in FIG. 2, wherein each microvane was oriented such that the forward end of the microvane is at an angle of approximately +25° to the airflow at that point on the aircraft relative to the airflow. Put differently, the forward end 114 of the microvane 108 was positioned at an angle of 25° nose up to the relative airflow at the location of the microvane. The second orientation is summarized in Table 2, corresponding to the microvane 108 placement demonstrated in FIG. 6, wherein each microvane was oriented such that the forward end of the microvane is at an angle of approximately −25° to the airflow at that point on the aircraft relative to the airflow. Put differently, the forward end of the microvane 108 was positioned at an angle of 25° nose down to the relative airflow at the location of the microvane.

Figure 7A:
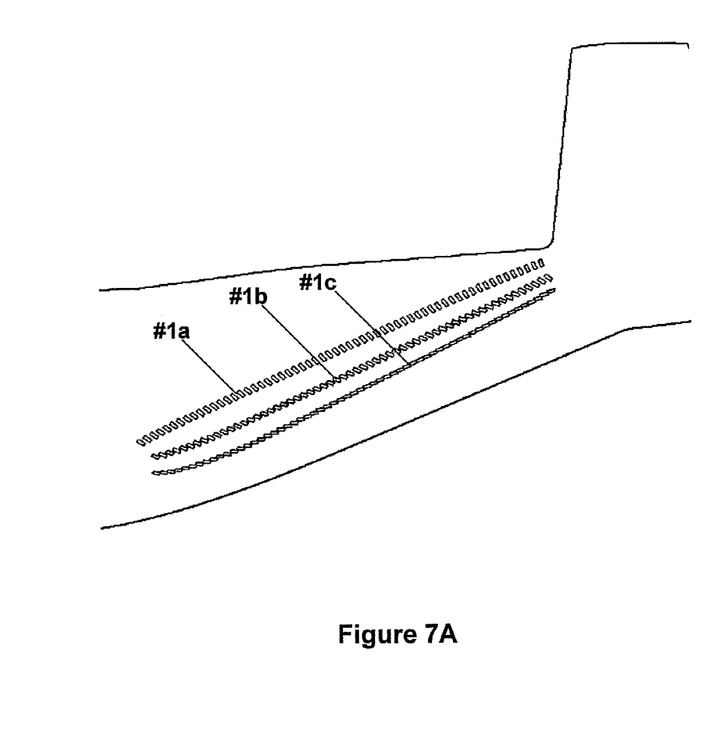
FIG. 7A is a side view of an aircraft showing the placement of various drag reduction elements at various locations.
Figure 7B:
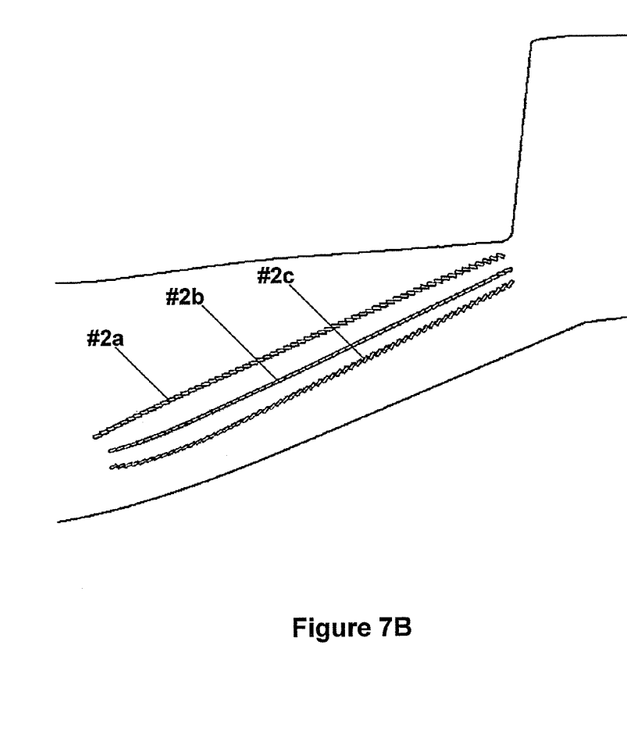
FIG. 7B is a side view of an aircraft showing alternate placement of various drag reduction elements at various locations.

Referring now to FIGS. 7A and 7B, and Tables 1 and 2, the microvane 108 orientation was simulated at three locations on the fuselage 102 of the aircraft corresponding to position a, in front of the point at which the airflow about the fuselage changes directions or separates, position b, the approximate point at which the airflow about the fuselage changes or separates, and position c, on the aft upswept portion 106 of the fuselage 102. FIG. 7A and Table 1 correspond to the microvanes 108 being positioned at an angle of +25° nose-up to the airflow. FIG. 7B and Table 2 correspond to the microvanes 108 being positioned at an angle of −25° nose-up to the airflow.

In the first simulation, summarized below in Table 1, the microvanes 108 were positioned such that the forward end 112 was approximately +25° to the air flow, as shown in FIG. 7A. As shown in Table 1, at location 1a, drag is reduced by at least about 13 drag counts. At location 1b, the point approximately at which the flow at the aft of the fuselage changes in direction, drag was reduced by at least about 9 drag counts. A drag count unit is equal to a drag coefficient increment of 0.0001. The drag coefficient is a non-dimensional value describing the drag force on the aircraft and is equal to the dimensional drag force divided by both the aircraft wing area and freestream dynamic pressure, all appropriately dimensioned. The values provided in Table 1 take into account a drag of approximately 1 count that is assigned to the drag associated with the microvanes 108 themselves.

TABLE 1

| Location | Forward End of Microvane Angle to Flow Direction | Change in Drag Counts |
| --- | --- | --- |
| 1a | +25° | −13 |
| 1b | +25° | −9.5 |
| 1c | +25° | −3 |

Figure 6:
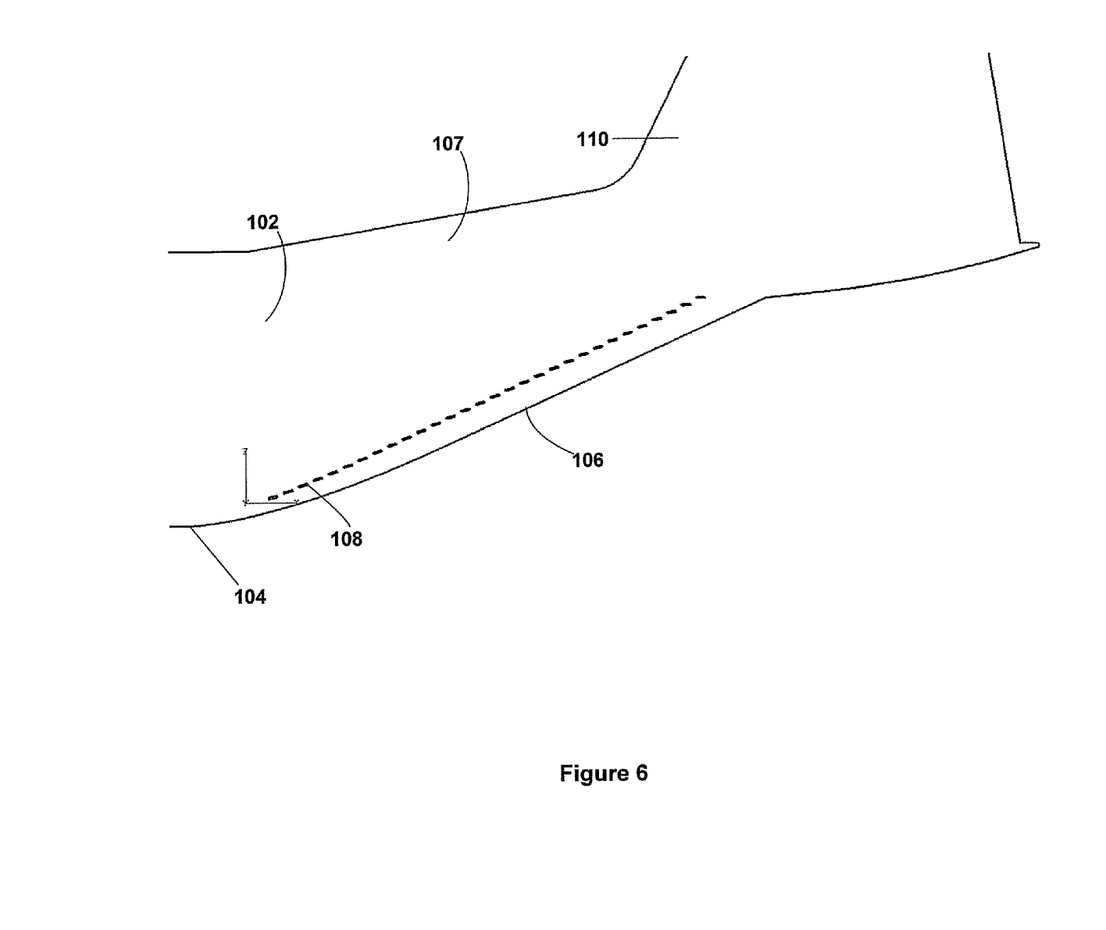
FIG. 6 is a side view of an alternate embodiment of an aircraft according to the present invention showing the positioning of various drag reduction elements.

In the second orientation, summarized below in Table 2 and corresponding to the microvane placement shown in FIG. 6, the microvanes 108 were positioned such that the forward end 112 was approximately −25° to the air flow, as shown in FIG. 7B. As shown in Table 2, at location 2a, drag increased by approximately 16 drag counts, relative to the drag of the aircraft without the presence of the microvanes 108. At locations 2b and 2c, the point approximately at which the flow at the aft of the fuselage changes in direction and on the aft portion of the aircraft, respectively, drag increased by approximately 8 drag counts. The values provided in Table 2 account for a drag of approximately 1 count that is assigned to the drag associated with the microvanes 108.

TABLE 2

| Location | Forward End of Microvane Angle to Flow Direction | Change in Drag Counts |
| --- | --- | --- |
| 2a | −25° | +16.5 |
| 2b | −25° | +8 |
| 2c | −25° | +8 |

Thus, by comparing the simulation results presented in Tables 1 and 2, it is shown that the addition of microvanes having a nose-down orientation increase overall drag of the aircraft and are not desired.

Placement of microvanes along the breakline of an aircraft having an upswept aft area may result in an overall reduction of the aircraft drag counts of at least 10 counts. In alternate embodiments, an overall reduction of the drag counts of at least 15 counts, preferably at least 20 counts, more preferably at least 25 counts, and even more preferably at least 30 counts.

In certain embodiments, the placement of the microvanes along the breakline of the fuselage of an aircraft having an upswept rear may result in an increase in the lift counts. The increase in lift may be at least about 0.5 counts, or alternately may be at least 1.0 counts. A lift count is defined as unit is equal to a lift coefficient increment of 0.001. The lift coefficient is a non-dimensional value describing the lift force on the aircraft and is equal to the dimensional lift force divided by both the aircraft wing area and freestream dynamic pressure, all appropriately dimensioned.

A CFD simulation where the vanes were directly modeled was also completed. This simulation included aircraft wings and propeller effects. The simulation employed 30 vanes, each 0.6 inch tall and 10 inches long in the 25 degree nose-up configuration, as shown in FIG. 1a. A drag reduction of about 13 counts was again obtained. This represents a reduction of approximately 5% in total vehicle drag.

In addition to being well suited for application on newly constructed aircraft, microvanes according to the present invention are also well suited for retrofit applications.

The microvanes 108 can be installed on an aircraft fuselage 102, either during new construction or in retrofit applications, by a variety of known means, including but not limited to, welding, mounting with screws, rivets or other like devices, or with the application of a suitable adhesive. For retrofit applications, the microvane 108 may be attached to the outer fuselage 102 surface without causing damage to any of the structural elements of the airframe. Additionally, unlike many other retrofit applications, as described herein, the application of the microvanes 108 in retrofit applications requires no major structural modifications and generally has little or no operational impact on the aircraft, other than the desired reduction in drag.

As noted previously, the present invention is preferably applied to aircraft having an upswept tail, such as for example, transport aircraft having a rear cargo door (e.g., Lockheed C-130, Boeing C-17, and the like). While the invention is described herein with reference to an aircraft having an upswept rear portion, it is understood that the microvanes that are described herein may be installed on a variety of craft, such as for example certain helicopters, and are not limited to aircraft.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. An aircraft having a fuselage, an upswept after body beginning at the breakline, the improvement comprising:
   a plurality of drag reducing elements, each of said drag reducing elements having a first end and a second end;
   wherein said drag reducing elements are positioned on each side of the aircraft fuselage beginning at the breakline and extending rearward toward the tail of the aircraft, and
   wherein each drag reducing element is positioned nose-up at an angle relative to the direction of the airflow about the fuselage at the location of the drag reducing element in the range of between approximately 15 and 35°.

2. The apparatus of claim 1 wherein at least one drag reducing element is at an angle relative to the longitudinal axis of the fuselage that is different than other drag reducing elements.

3. The apparatus of claim 1 wherein the first end of each drag reducing elements is positioned nose-up at an angle of between approximately 20 and 30° relative to the airflow about the fuselage of the aircraft.

4. The apparatus of claim 1 wherein the first end of each drag reducing elements is positioned nose-up at an angle of between approximately 22 and 28° relative to the airflow about the fuselage of the aircraft.

5. The apparatus of claim 1 wherein each drag reducing element comprises a flat, thin microvane.

6. The apparatus of claim 1 wherein the drag reducing elements are uniformly spaced apart from each other.

7. The apparatus of claim 1 wherein each drag reducing elements is positioned such that relative to the longitudinal axis of the fuselage, the forward end of each drag reducing element is elevated relative to the rearward end of the drag reducing element.

8. A method for reducing drag on an aircraft having an upswept afterbody, said upswept afterbody beginning at a breakline of the fuselage, comprising:

positioning a plurality of drag reducing elements linearly on each side of the afterbody fuselage from a point near the bottom of the fuselage extending upward toward an empennage; and flying the aircraft and causing an airflow about the fuselage of the aircraft, wherein the drag reducing elements are operable to reduce production of vortices at the upswept afterbody produced by the airflow about the fuselage.

9. The method of claim 8 wherein each drag reducing element is positioned such that the forward end of the drag reducing element is positioned nose-up at an angle relative to the airflow about the fuselage of between about 15 and 35°.

10. The method of claim 8 wherein each drag reducing element is positioned such that the forward end of the drag reducing element is positioned nose-up at an angle relative to a longitudinal axis of the aircraft of between about 15 and 35°.

11. The method of claim 8 wherein each drag reducing elements is inclined relative to a longitudinal axis of the aircraft such that the forward end is elevated relative the rearward end.

12. An array of microvanes along a line following an aft contour of an upswept afterbody of the aircraft beginning at a breakline, comprising:

a plurality of microvanes positioned on each side of the aircraft fuselage beginning at the breakline and extending rearward toward a vertical stabilizer such that relative to a longitudinal axis of the aircraft, the forward end of each microvane is raised relative to the rearward end;

said plurality of microvanes spaced apart from each other, each microvane having a flat top surface, a height of less than about 2 inches, a forward end and a rearward end.

13. The array of claim 12 wherein each microvane is positioned such that relative to the longitudinal axis, the forward end of the microvane is positioned nose up at an angle of between 15 and 35°.

14. The array of claim 12 wherein each microvane is positioned such that relative to the longitudinal axis, the forward end of the microvane is positioned nose up at an angle of between 20 and 30°.

15. The array of claim 12 wherein each microvane is positioned such that relative to the airflow at the position of the microvane, the forward end of the microvane is positioned nose up at an angle of between 15 and 35°.

16. The array of claim 12 wherein each microvane is positioned such that relative to the airflow at the position of the microvane, the forward end of the microvane is positioned nose up at an angle of between 20 and 30°.

17. The array of claim 12 wherein at least one microvane is positioned such that relative to the longitudinal axis of the aircraft, the microvane is positioned at an angle different than the other microvanes.

18. An aircraft having a fuselage, an upswept after body beginning at the breakline, the improvement comprising:

a plurality of drag reducing elements, each of said drag reducing elements having a first end and a second end;

wherein said drag reducing elements are positioned on each side of the aircraft fuselage beginning at the breakline and extending rearward toward the tail of the aircraft, and wherein each drag reducing element is positioned nose-up at an angle relative to the longitudinal axis of the aircraft fuselage in the range of between approximately 15 and 35°.

19. The aircraft of claim 18 wherein at least one drag reducing element is at an angle relative to the longitudinal axis of the fuselage that is different than other drag reducing elements.

20. The aircraft of claim 18 wherein the first end of each drag reducing elements is positioned nose-up at an angle of between approximately 20 and 30° relative to the airflow about the fuselage of the aircraft.

21. The aircraft of claim 18 wherein the first end of each drag reducing elements is positioned nose-up at an angle of between approximately 22 and 28° relative to the airflow about the fuselage of the aircraft.

22. The aircraft of claim 18 wherein each drag reducing element comprises a flat, thin microvane.

23. The aircraft of claim 18 wherein the drag reducing elements are uniformly spaced apart from each other.

24. The aircraft of claim 18 wherein each drag reducing elements is positioned such that relative to the longitudinal axis of the fuselage, the forward end of each drag reducing element is elevated relative to the rearward end of the drag reducing element.

* * * * *